(12) United States Patent
Wang et al.

(10) Patent No.: US 8,139,160 B2
(45) Date of Patent: Mar. 20, 2012

(54) TELEVISION TUNER WITH DOUBLE QUADRATURE MIXING ARCHITECTURE

(75) Inventors: Fucheng Wang, San Jose, CA (US); Chao-Tung Yang, Hsinchu (TW); Yi Lu, Hsinchu (TW)

(73) Assignee: MStar Semiconductor, Inc., Hsinchu (TW)

( * ) Notice: Subject to any disclaimer, the term of this patent is extended or adjusted under 35 U.S.C. 154(b) by 1181 days.

(21) Appl. No.: 11/924,356

(22) Filed: Oct. 25, 2007

(65) Prior Publication Data
US 2008/0100754 A1     May 1, 2008

Related U.S. Application Data

(60) Provisional application No. 60/862,978, filed on Oct. 25, 2006.

(51) Int. Cl.
    *H04N 5/44* (2011.01)
(52) U.S. Cl. ......... 348/731; 348/725; 348/726; 375/324
(58) Field of Classification Search .......... 348/731–733, 348/725–726; 375/295, 324, 261, 340; 455/154.1, 455/165.1, 189.1, 190.1, 323
    See application file for complete search history.

(56) References Cited

U.S. PATENT DOCUMENTS

| | | | |
|---|---|---|---|
| 4,653,117 A | 3/1987 | Heck | |
| 5,157,343 A * | 10/1992 | Voorman | 329/319 |
| 5,737,035 A | 4/1998 | Rotzoll | |
| 5,739,874 A | 4/1998 | Badger | |
| 5,956,075 A | 9/1999 | Matsuo | |
| 6,198,345 B1 * | 3/2001 | Hornak | 327/552 |
| 6,838,947 B2 * | 1/2005 | Gomez | 331/17 |
| 7,180,553 B2 * | 2/2007 | Su | 348/731 |
| 7,212,581 B2 * | 5/2007 | Birkett et al. | 375/295 |
| 7,251,466 B2 * | 7/2007 | Porret et al. | 455/190.1 |
| 7,356,318 B2 * | 4/2008 | Sowlati | 455/168.1 |
| 7,394,874 B2 * | 7/2008 | Birkett et al. | 375/324 |
| 7,450,185 B2 | 11/2008 | Wu | |
| 7,593,491 B1 * | 9/2009 | Khlat et al. | 375/344 |
| 7,605,669 B2 * | 10/2009 | Pullela et al. | 331/45 |
| 2004/0125240 A1 * | 7/2004 | Stikvoort et al. | 348/731 |

(Continued)

FOREIGN PATENT DOCUMENTS

CN     1619970 A     5/2005

(Continued)

OTHER PUBLICATIONS

Mark Dawkins et. al., "A Single-Chip Tuner for DVB-T," IEEE Journal of Solid-State Circuits, vol. 38, No. 8, Aug. 2003.

(Continued)

*Primary Examiner* — Annan Shang
(74) *Attorney, Agent, or Firm* — Kirton McConkie; Evan R. Witt

(57) ABSTRACT

A television tuner employs a double quadrature mixing architecture to frequency-translate VHF/UHF TV signals to various standard IF frequencies. In the television tuner, a quadrature mixer converts the input television signal into a first in-phase signal and a first quadrature-phase signal according to a first reference signal, and a double quadrature mixer converts the first in-phase signal and first quadrature-phase signal into a second in-phase signal and a second quadrature-phase signal according to a second reference signal, and a polyphase filter filters the second in-phase signal and second quadrature-phase signal to produce an output signal.

19 Claims, 5 Drawing Sheets

U.S. PATENT DOCUMENTS

| | | |
|---|---|---|
| 2005/0001937 A1 | 1/2005 | Lee et al. |
| 2005/0003773 A1 | 1/2005 | Cowley et al. |
| 2005/0090213 A1 | 4/2005 | Heng et al. |
| 2005/0117071 A1 | 6/2005 | Johnson |
| 2005/0164662 A1 | 7/2005 | Tseng et al. |
| 2006/0001779 A1 | 1/2006 | Favrat et al. |
| 2006/0078069 A1* | 4/2006 | Seendripu et al. ............ 375/316 |
| 2007/0132889 A1* | 6/2007 | Pan ............................... 348/726 |
| 2007/0140391 A1 | 6/2007 | Pan |
| 2007/0218850 A1 | 9/2007 | Pan |

FOREIGN PATENT DOCUMENTS

| | | |
|---|---|---|
| CN | 1798287 A | 7/2006 |
| TW | 315549 | 9/1997 |
| TW | I249348 | 2/2006 |
| TW | I253856 | 4/2006 |
| TW | 200618626 | 6/2006 |
| WO | 2004064246 A1 | 7/2004 |
| WO | 2005091493 A1 | 9/2005 |

OTHER PUBLICATIONS

Jan Van Sinderen et. al., "A 48-80 MHz Digital Cable Tuner IC with Integrated RF and IF selectivity," ISSCC 2003, Session 25.3.

D. Salas et. al., "A 0.12 mm CMOS DVB-T tuner," ISSCC 2005, Session 23.3.

Chun-Huat Heng et. al., "A CMOS TV Tuner/Demodulator IC with Digital Image Rejection," IEEE Journal of solid State Circuits, vol. 40, No. 12, p. 2525, Dec. 2005.

* cited by examiner

TELEVISION TUNER WITH DOUBLE QUADRATURE MIXING ARCHITECTURE

CROSS REFERENCE TO RELATED PATENT APPLICATION

This patent application claims the benefit of U.S. provisional patent application No. 60/862,978 filed Oct. 25, 2006.

FIELD OF THE INVENTION

The present invention relates to a television tuner, and more particularly to a television tuner with a double quadrature mixing architecture for frequency-translating a television signal with a high radio frequency.

BACKGROUND OF THE INVENTION

In general, the spectrum of a VHF (very high frequency) or UHF (ultra high frequency) radio-frequency television signal lies between 48 MHz and 860 MHz. Within this range, a plurality of channels are covered and each channel is typically allocated with a bandwidth of 6~8 MHz. In NTSC standard, a video carrier frequency positions at 1.25 MHz above the lower-margin of the bandwidth; a color carried frequency positions at 3.58 MHz higher than the video carrier frequency; while an audio carrier frequency positions at 4.5 MHz higher than the video carrier frequency. For example, Channel 2 has a bandwidth of 6 MHz ranged from 54 MHz to 60 MHz. Meanwhile, the video carrier frequency, color carrier frequency and audio carrier frequency position at 55.25 MHz, 58.83 MHz and 59.75 MHz, respectively.

When the radio-frequency television signal having the above-mentioned feature is received by an antenna or a cable and transmitted to the television tuner, the television tuner selects one or more channels accordingly, and converts the associated signal into an intermediate frequency (IF) signal or a base-band frequency signal which are subsequently processed by a demodulator.

In early ages, a conventional CAN tuner includes a mixer for directly down-converting the radio-frequency television signal into an intermediate frequency signal or a base-band frequency signal, as illustrated in FIG. 1. The radio-frequency television signal (I) including a plurality of channels multiplies a reference signal (II) with a reference frequency $f_{LO}$ in the mixer. In this way, a channel A with a frequency band positioned at the reference frequency $f_{LO}$ can be down-converted into a base-band frequency signal.

Applying a switching mixer, the reference signal is a square-wave signal having a 50% duty cycle. A plurality of harmonic frequencies, e.g. 3 $f_{LO}$, 5 $f_{LO}$, 7 $f_{LO}$, etc., coming from the reference signal are also down-converted to the base-band frequency signal together with the reference frequency $f_{LO}$. Channels B, C and D position at the harmonic 3 $f_{LO}$, 5 $f_{LO}$, 7 $f_{LO}$, respectively. In other words, the associated signals of the channels A, B, C and D all appear in the base-band signal (III).

For readily identifying the desired channel A, the signal power of the channel A is supposed to be much higher, for example 30 dB higher than any co-channel interferer to maintain a desirable signal quality. Assuming on a condition that the signal power of either channel B, C or D is adversely 30 dB higher than that of the channel A, a component for providing at least the 60-dB harmonic rejection ratio is required to alleviate possible SNR (signal-to-noise ratio) degradation.

Conventionally, several RF (radio-frequency) tracking filters are utilized to reduce the harmonic power of the radio-frequency television signal prior to the entrance of the radio-frequency television signal into the mixer, in order to solve the above-mentioned harmonic problem.

However, such a tuner is generally bulky due to the incorporation of several discrete electronic devices such as the above-mentioned RF tracking filters, and thus is called as a CAN tuner. Moreover, the RF tracking filters require a high voltage varactor for band tuning. It is thus not only cost-ineffective but also hard to be integrated into a single-chip IC (integrated circuit) for reducing the module footprint.

With remarkable advances of semiconductor technologies to produce highly integrated silicon chips, a television tuner can also be manufactured as a single chip so as to reduce device size and cost. U.S. Pat. No. 5,737,035 discloses such a television tuner and is incorporated herein for reference.

A single-chip television tuner as suggested by U.S. Pat. No. 5,737,035 is illustrated in FIG. 2, wherein an up-down dual conversion tuner with two mixers is used. After a radio-frequency television signal is received by an antenna 402 (or a cable), it is first subjected to a cutoff frequency of, e.g. 900 MHz, an RF lowpass filter 404 to result in a frequency band below 900 MHz. Then the filtered radio-frequency television signal passes through a low-noise transconductance amplifier (LNTA) 406 so as to be amplified with a certain gain, e.g. 20 dB. Subsequently, the amplified radio-frequency television signal is mixed with a first reference signal in a first mixer 408 to output a first intermediate frequency signal. The first intermediate frequency signal is then mixed with a second reference signal in a second mixer 410 to output a second intermediate frequency signal so as to extract a desired channel with a specified carrier frequency.

The first mixer 408 is a subtractive mixer and the first reference signal is generated by a first local oscillator 411 to have an operating frequency tunable in the range between 1200 MHz and 2100 MHz. By adjusting the frequency of the first reference signal, the carrier frequency of a desired channel included in the resulting first intermediate frequency signal can be obtained as 1200 MHz. On the other hand, the second mixer 410 is an image rejection mixer and the second reference signal is generated by a second local oscillator 412 to have an operating frequency of 1180 MHz. With the mixing of the second reference signal, the carrier frequency of the desired channel included in the resulting second intermediate frequency signal can be obtained at 20 MHz, i.e. (1200-1180) MHz. The first mixer 408 up-converts the carrier frequency of the desired channel to 1200 MHz to minimize harmonic effects, and then the second mixer 410 down-converts the carrier frequency of the desired channel to 20 MHz.

This tuner rejects signal energy in the first intermediate frequency signal that is in the area of 1160 MHz, which would also yield |1160−1180|=20 MHz. FIG. 3 illustrates another up-down dual conversion tuner similar to the tuner of FIG. 2 but further including an IF filter 409 between the mixers 408 and 410 to reject the image frequency component 1160 MHz from the first intermediate frequency signal.

The above-mentioned single-chip television tuners use a reference signal with a tunable frequency and another reference signal with a fixed frequency to mix the radio-frequency television signal to obtain the carrier frequency of the desired channel. In order to adjust the frequency of the first reference signal in a relatively wide range, a plurality of voltage controlled oscillators (VCOs) are needed and that results in higher circuit complexity and chip size.

SUMMARY OF THE INVENTION

Therefore, the present invention suggests another television tuner architecture with reduced device size and cost compared to conventional CAN tuners.

The present invention provides a dual-conversion television tuner or a dual-conversion band-folded television tuner with a double quadrature mixing architecture to frequency-translate a television signal.

The television tuner according to the present invention includes a first local oscillator generating a first reference signal with a fixed frequency; a quadrature mixer receiving and converting the television signal into a first in-phase signal and a first quadrature-phase signal according to the first reference signal; a second local oscillator generating a second reference signal which has a frequency tunable according to a target carrier frequency of a desired channel to be frequency-translated; a double quadrature mixer receiving and converting the first in-phase signal and first quadrature-phase signal into a second in-phase signal and a second quadrature-phase signal according to the second reference signal; and a polyphase filter receiving and filtering the second in-phase signal and second quadrature-phase signal, thereby obtaining an output signal covering the target carrier frequency of the desired channel.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
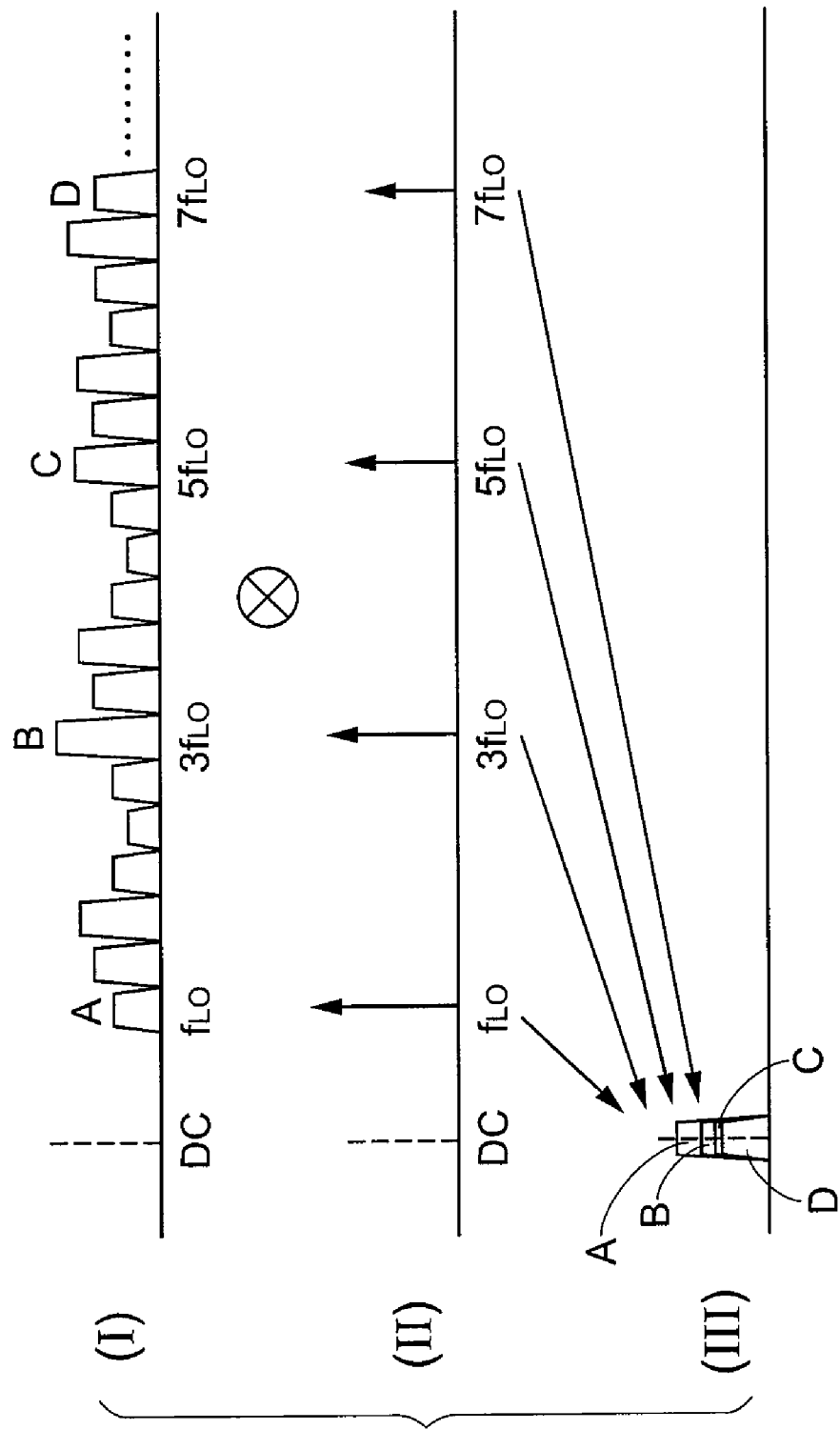
FIG. 1 is a schematic diagram showing a traditional single conversion operation.
Figure 2:
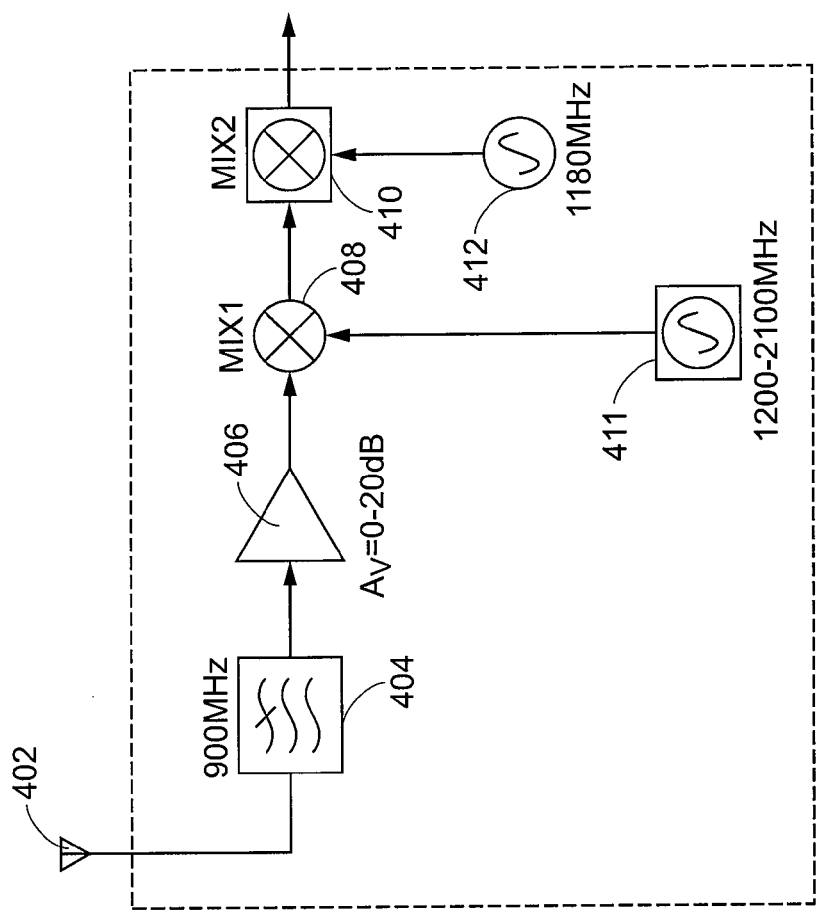
FIG. 2 is a circuit block diagram schematically illustrating a conventional dual conversion television tuner.
Figure 3:
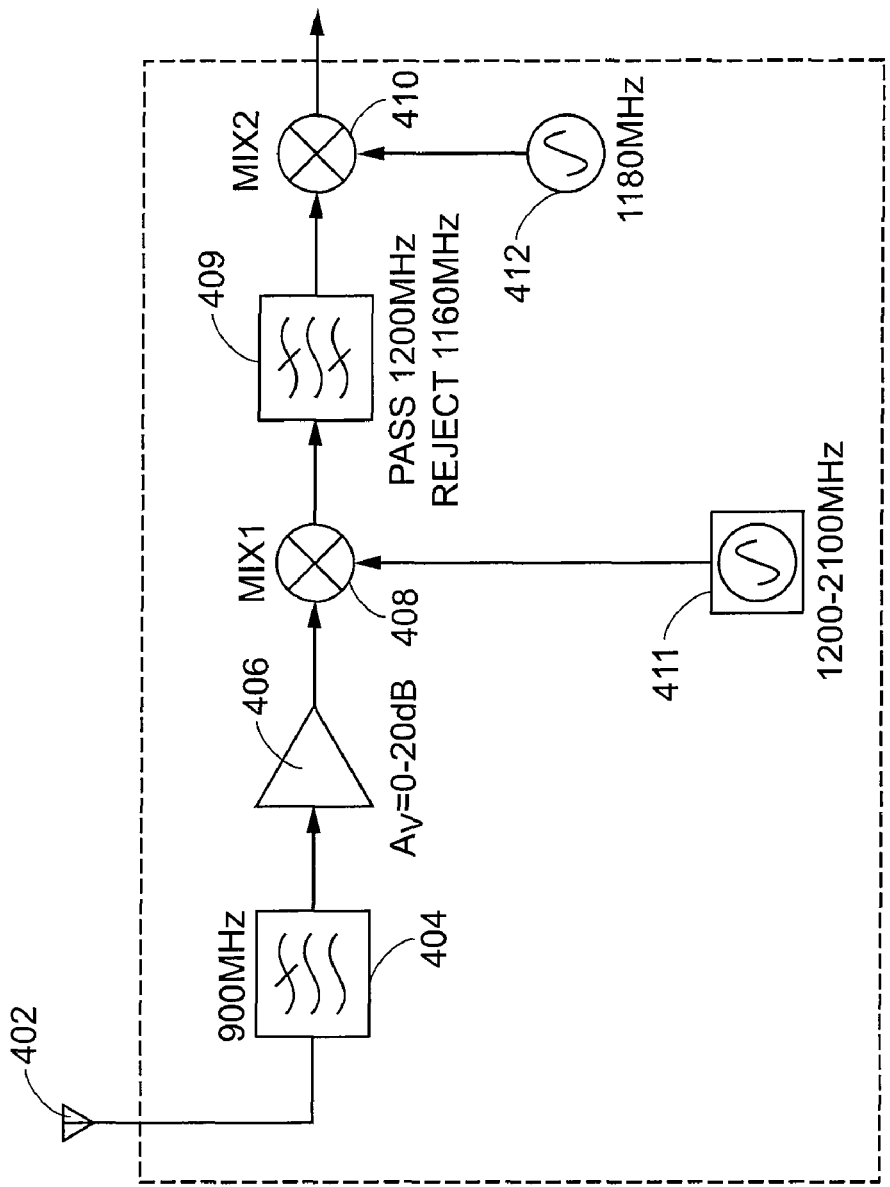
FIG. 3 is a circuit block diagram schematically illustrating another conventional dual conversion television tuner.
Figure 4:
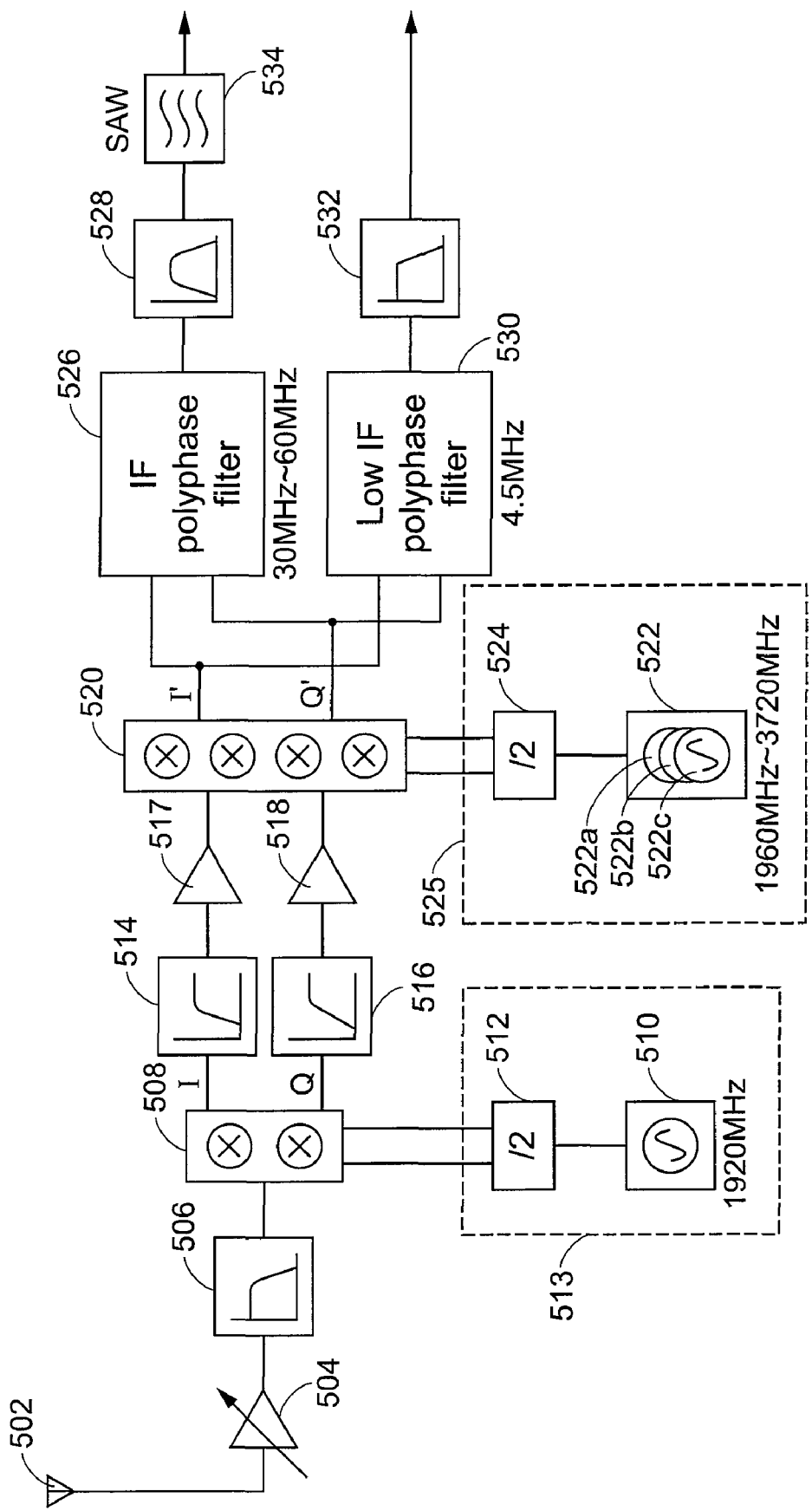
FIG. 4 is a circuit block diagram schematically illustrating a television tuner according to an embodiment of the present invention.

Please refer to FIG. 4. A television tuner with a double quadrature mixing architecture according to an embodiment of the present invention is illustrated. The double quadrature dual conversion tuner includes two local oscillators 513 and 525 for respectively generating first and second reference signals, a quadrature mixer 508 for mixing an input television signal with the first reference signal to generate a first pair of in-phase and quadrature-phase signals, and a double quadrature mixer 520 for mixing the first pair of in-phase and quadrature-phase signals with the second reference signal to generate a second pair of in-phase and quadrature-phase signals. Through the filtering of the second pair of in-phase and quadrature-phase signals by an IF polyphase filter 526, an IF signal covering a desired channel can be produced. Alternatively, through the filtering of the second pair of in-phase and quadrature-phase signals by a low IF polyphase filter 530, a low IF signal covering a desired channel can be produced.

The radio-frequency (RF) television signal, after being received from an antenna 502 (or a cable), is passed through a low-noise variable gain amplifier 504. Then the RF signal is subjected to a cutoff frequency of, e.g. 900 MHz, an RF low pass filter 506 to result in a frequency band below 900 MHz. By inputting the filtered RF signal into the quadrature mixer 508 to mix with the first reference signal, a first in-phase signal I and a first quadrature-phase signal Q are generated.

For mixing with the input RF television signal to output the first in-phase signal I and the first quadrature-phase signal Q, the first reference signal includes two signals with the same frequency but at a phase difference of 90 degrees. The first reference signal is generated by the first local oscillator 513 which includes a voltage controlled oscillator (VCO) 510 and a frequency-divider 512. The VCO 510 generates an oscillating signal of 1920 MHz, which is divided by two in the divider 512, thereby generating the two signals sin ωt and cos ωt for the first reference signal having a frequency $f_1$=960 MHz and a phase difference by 90 degrees, where $\omega=2\pi f_1$. By using an additive mixer as the quadrature mixer 508, the first in-phase signal I and first quadrature-phase signal Q are wide-band IF signals resulting from frequency shifting of the filtered RF signal. Therefore, the first in-phase signal I and the first quadrature-phase signal Q can cover all channels.

Then the first in-phase signal I and the first quadrature-phase signal Q are inputted into respective high pass filters 514 and 516 and respective amplifiers 517 and 518 for proper filtering and amplification before they are transmitted to the double quadrature mixer 520. By mixing the filtered first in-phase signal I and first quadrature-phase signal Q with the second reference signal in the double quadrature mixer 520, a second in-phase signal I' and a second quadrature-phase signal Q' are generated.

For mixing with the filtered first in-phase signal I and first quadrature-phase signal Q to generate the second in-phase signal I' and second quadrature-phase signal Q', the second reference signal includes two signals with the same frequency but at a phase difference of 90 degrees. The second reference signal is generated by the second local oscillator 525 which includes a VCO set 522 and a frequency-divider 524. The VCO set 522 has a tunable frequency range between 1960 MHz and 3720 MHz which includes three VCOs, 522a, 522b and 522c for generating an oscillating signal. The divider 524 divides the oscillating signal by two to output the second reference signal which comprises two signals of the same frequency but with 90-degree phase difference and having a frequency ranging from 980 MHz to 1860 MHz. Being multiplied with the second reference signal by the double quadrature mixer 520, the filtered first in-phase signal I and first quadrature-phase signal Q are converted into four signals including an in-phase in-phase signal II, an in-phase quadrature-phase signal IQ, a quadrature-phase in-phase signal QI and a quadrature-phase quadrature-phase signal QQ. The in-phase in-phase signal II and quadrature-phase in-phase signal QI are further added to obtain the second in-phase signal I', and the in-phase quadrature-phase signal IQ and the quadrature-phase quadrature-phase signal QQ are further added to obtain the second quadrature-phase signal Q'.

Since the frequency of the oscillating signal generated by the VCO 522 is tunable, the frequency of the second reference signal can be tuned depending on a desired channel. By way of the mixing operation in the double quadrature mixer 520, the desired channel is converted into IF (intermediate frequency 30~60 MHz) domain. Through the upper path, the intermediate frequency signal is then passed through the IF polyphase filter 526 for rejecting image-frequency signals, and further filtered by a band pass filter 528 to eliminate noise, thereby obtaining a carrier frequency at 40 MHz for the specified channel. A desired analog television channel can be produced through this path. The output signal is further filtered through a surface acoustic wave (SAW) filter 534 to eliminate the out-of-channel noise before being outputted.

On the other hand, the frequency of the second reference signal can be tuned in order that a desired channel can be frequency-converted to a low-intermediate frequency at 4.5 MHz after the mixing operation in the double quadrature mixer 520. The low-intermediate frequency signal is then passed through the low IF polyphase filter 530 for rejecting image-frequency signals, and further filtered by a low pass filter 532 to eliminate out-of-channel noise, thereby obtaining a carrier frequency at 4.5 MHz for the desired channel. For example, a digital television channel can be produced through this path.

Table 1 lists oscillating frequency ranges (VCO Range), tuning percentages (Tuning %), divide ratios and resulting local oscillating frequency ranges (LO Range) of VCOs 510, 522a, 522b and 522c in FIG. 4.

TABLE 1

|  | VCO Range (MHz) | Tuning (%) | Divide Ratio | LO Range |
|---|---|---|---|---|
| VCO 510 | 1920 | 0 | 2 | 960 |
| VCO 522a | 1960~2480 | 23.4 | 2 | 980~1240 |
| VCO 522b | 2420~3020 | 22.1 | 2 | 1210~1510 |
| VCO 522c | 2960~3720 | 22.7 | 2 | 1480~1860 |

Figure 5:
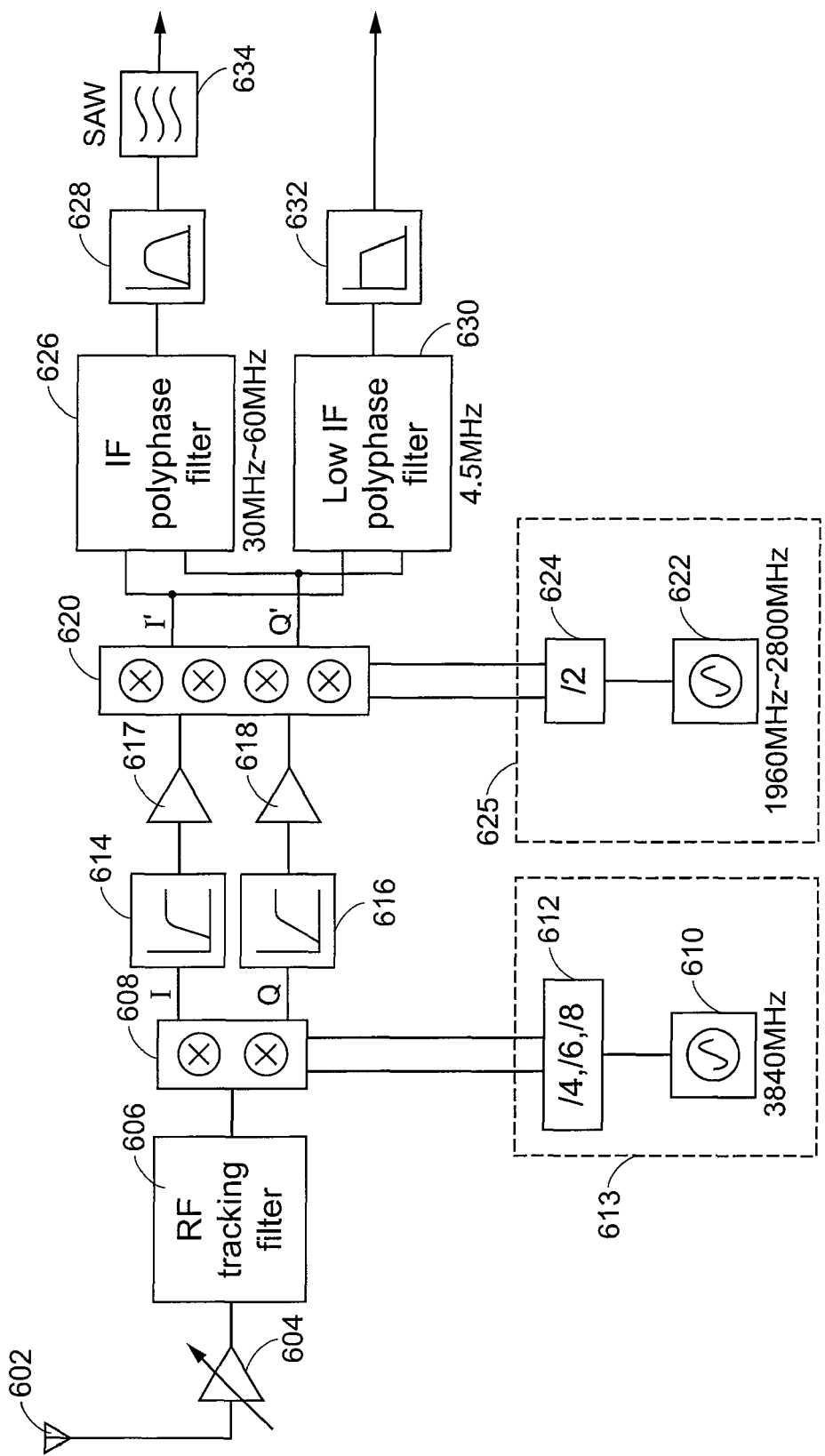
FIG. 5 is a circuit block diagram schematically illustrating a television tuner according to another embodiment of the present invention.

FIG. 5 schematically illustrates a television tuner with a double quadrature mixing architecture according to another embodiment of the present invention. A radio-frequency television signal, after being received from an antenna 602, is passed through the low-noise variable gain amplifier 604, and then passed through an RF tracking filter 606, thereby primarily selecting a desired band from the RF television signal. A quadrature mixer 608, which is an additive mixer, generates a first in-phase signal I and a first quadrature-phase signal Q by mixing a first reference signal with the filtered RF television signal. The first reference signal is generated by a first local oscillator 613 and includes two signals having the same frequency but at a phase difference by 90 degrees. The first local oscillator 613 includes a VCO 610 and a frequency-divider 612. The VCO 610 generates an oscillating signal of 3840 MHz, which is subsequently divided by an integer selected from 4, 6 and 8 by the divider 612. Accordingly, the pair of signals included in the first reference signal has the same frequency 960 MHz, 640 MHz or 480 MHz and a 90-degree phase difference. Since the quadrature mixer 608 is an additive mixer, the resulting first in-phase signal I and first quadrature-phase signal Q are wide-band IF signals obtained by frequency-shifting the filtered RF television signal.

Preferably, the RF television signal may be divided into three bands, e.g. the first band 50~380 MHz, the second band 370~700 MHz and the third band 530~860 MHz. If a desired channel to be frequency-translated lies within the first band, the RF tracking filter 606 will filter off signals beyond the first band. Meanwhile, the divider 612 divides the oscillating signal generated by the VCO 610 by four to result in a frequency 960 MHz of the first reference signal. Accordingly, the output signals of the quadrature mixer 608 will lie in the band 1010~1340 MHz. In other words, a carrier frequency of the desired channel is frequency-translated to be within the range 1010~1340 MHz. On the other hand, if a desired channel to be frequency-translated lies within the second band, the RF tracking filter 606 will filter off signals beyond the second band. Meanwhile, the divider 612 divides the oscillating signal generated by the VCO 610 by six to result in a frequency 640 MHz of the first reference signal. Accordingly, the output signals of the quadrature mixer 608 will also lie in the band of 1010~1340 MHz. In other words, a carrier frequency of the desired channel is frequency-translated to be within the range 1010~1340 MHz. Likewise, if a desired channel to be frequency-translated lies within the third band, the RF tracking filter 606 will filter off signals beyond the third band. Meanwhile, the divider 612 divides the oscillating signal generated by the VCO 610 by eight to result in a frequency 480 MHz of the first reference signal. Accordingly, the output signals of the quadrature mixer 608 will also lie in the band of 1010~1340 MHz. In other words, a carrier frequency of the desired channel is frequency-translated to be within the range 1010~1340 MHz.

Further, the first in-phase signal I and the first quadrature-phase signal Q are inputted into respective high pass filters 614 and 616 and respective amplifiers 617 and 618 to be properly filtered and amplified before they are transmitted to the double quadrature mixer 620. By mixing the filtered first in-phase signal I and first quadrature-phase signal Q with a second reference signal in the double quadrature mixer 620, a second in-phase signal I' and a second quadrature-phase signal Q' are generated.

The second reference signal is generated by a second local oscillator 625 and includes two signals having the same frequency but at a phase difference of 90 degrees. The second local oscillator 625 includes a VCO 622 and a frequency-divider 624 with a tunable frequency range 1960~2800 MHz. In this embodiment, a single frequency-tunable VCO is sufficient to generate an oscillating signal covering the desired frequency range. The oscillating signal generated by the VCO 622 is divided by two by the divider 624. Accordingly, the pair of signals included in the second reference signal has the same frequency ranged within 980~1400 MHz with a 90-degree phase difference. By multiplying the first in-phase signal I and first quadrature-phase signal Q with the second reference signal in the double quadrature mixer 620, four signals including in-phase in-phase signal II, in-phase quadrature-phase signal IQ, quadrature-phase in-phase signal QI and quadrature-phase quadrature-phase signal QQ are generated. The in-phase in-phase signal II and quadrature-phase in-phase signal QI are further added to obtain the second in-phase signal I', and the in-phase quadrature-phase signal IQ and the quadrature-phase quadrature-phase signal QQ are further added to obtain the second quadrature-phase signal Q'.

Since the frequency of the oscillating signal generated by the VCO 622 is tunable, the frequency of the second reference signal can be tuned thereby depending on a desired channel. By way of the mixing operation in the double quadrature mixer 620, a carrier frequency of the desired channel is frequency-converted into IF domain. The intermediate frequency signal is then passed through the IF polyphase filter 626 for image rejection, and further filtered by a band pass filter 628 to eliminate out-of-channel noise, thereby obtaining a carrier frequency 40 MHz of the desired channel. Generally speaking, an analog TV channel traverses through this path. Preferably, the output signal is further passed through a surface acoustic wave (SAW) filter 634 to eliminate more out-of-channel noise before being outputted.

On the other hand, the frequency of the second reference signal can be tuned to frequency-convert a carrier frequency of a desired channel into a low-intermediate frequency 4.5 MHz after the mixing operation in the double quadrature mixer 620. The low-intermediate frequency signal is then passed through the low IF polyphase filter 630 for image rejection, and further filtered by a low pass filter 632 to eliminate out-of-channel noise, thereby obtaining a carrier frequency 4.5 MHz of the desired channel. Generally speaking, a digital TV channel can be located through this path.

In view of the foregoing, a VHF/UHF RF TV signal having a frequency range between 48 MHz and 860 MHz, for example, can be translated into various IF signals including an intermediate carrier frequency, e.g. 40 MHz, typically indicating an analog TV channel, and a low-intermediate carrier frequency, e.g. 4.5 MHz, typically indicating a digital TV channel.

Table 2 lists oscillating frequency ranges (VCO Range), tuning percentages (Tuning %), divide ratios (Divide Ratio) and resulting local oscillating frequency ranges (LO Range) of VCOs 610 and 625 in FIG. 5.

TABLE 2

|  | VCO Range (MHz) | Tuning (%) | Divide Ratio | LO Range |
|---|---|---|---|---|
| VCO 610 | 3840 | 0 | 4 | 960 |
|  |  |  | 6 | 640 |
|  |  |  | 8 | 480 |
| VCO 625 | 1960~2800 | 35 | 2 | 980~1400 |

In this embodiment, the RF television signal is properly band-selected prior to inputting into the quadrature mixer 608. Therefore, the frequency range of the second reference signal required for the subsequent double quadrature mixing procedure can be reduced to a smaller one achievable by a single VCO. The present invention utilizes a quadrature mixer operating with a fixed-frequency reference signal and a double quadrature mixer operating with a tunable-frequency reference signal to frequency-translate a desired channel. The image rejection can be enhanced through double quadrature mixing. Thus, the television tuner according to the present invention discloses a dual-conversion band-folded architecture to translate a VHF/UHF TV signal to various standard IF frequencies.

It is to be noted that the high pass filters and amplifiers disposed between the quadrature mixer and double quadrature mixer are optional depending on practical circuit designs and signal powers. In other words, it is feasible according to the present invention to omit the high pass filters and amplifiers and directly transmit the first in-phase signal I and first quadrature-phase signal Q outputted by the quadrature mixer to the double quadrature mixer.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A television tuner for frequency-translating a television signal, comprising:
   a first local oscillator for generating a first reference signal with a fixed frequency;
   a quadrature mixer for receiving and converting the television signal into a first in-phase signal and a first quadrature-phase signal according to the first reference signal;
   a second local oscillator for generating a second reference signal which has a frequency tunable according to a desired channel to be frequency-translated;
   a double quadrature mixer for receiving and converting the first in-phase signal and first quadrature-phase signal into a second in-phase signal and a second quadrature-phase signal according to the second reference signal; and
   a polyphase filter for receiving and filtering the second in-phase signal and second quadrature-phase signal to generate an output signal.

2. The television tuner according to claim 1 further comprising an RF low-noise variable gain amplifier disposed upstream of the quadrature mixer for amplifying the television signal.

3. The television tuner according to claim 1 further comprising an RF low pass filter for extracting from the television signal a signal having a frequency lower than a cutoff frequency to be inputted to the quadrature mixer.

4. The television tuner according to claim 1 further comprising an RF tracking filter for extracting from the television signal a signal having a frequency band selected from a plurality of different bands to be inputted to the quadrature mixer.

5. The television tuner according to claim 1 further comprising a pair of high pass filters disposed between the quadrature mixer and the double quadrature mixer for filtering the first in-phase signal and first quadrature-phase signal, respectively.

6. The television tuner according to claim 1 further comprising a pair of amplifiers for amplifying the first in-phase signal and first quadrature-phase signal, respectively.

7. The television tuner according to claim 1 wherein the polyphase filter includes an IF polyphase filter and a low IF polyphase filter for respectively receiving and filtering the second in-phase signal and second quadrature-phase signal.

8. The television tuner according to claim 7 further comprising a band pass filter and a surface acoustic wave (SAW) filter for serially filtering an output of the IF polyphase filter for eliminating noise from the output signal.

9. The television tuner according to claim 8 wherein the desired channel is an analog TV channel.

10. The television tuner according to claim 7 further comprising a low pass filter for filtering an output of the low IF polyphase filter for eliminating noise from the output signal.

11. The television tuner according to claim 10 wherein the desired channel is a digital TV channel.

12. The television tuner according to claim 1 wherein the first reference signal includes two signal having the same frequency with a 90-degree phase difference.

13. The television tuner according to claim 1 wherein the first local oscillator includes:
   a voltage control oscillator (VCO) for generating an oscillating signal with a fixed frequency; and
   a frequency-divider coupled to the voltage control oscillator for dividing the oscillating signal to generate the first reference signal with the fixed frequency.

14. The television tuner according to claim 13 wherein the frequency-divider utilizes a constant divide ratio to divide the oscillating signal.

15. The television tuner according to claim 13 wherein the frequency-divider selects a variable divide ratio from a plurality of divide ratios to divide the oscillating signal.

16. The television tuner according to claim 1 wherein the second reference signal includes two signal having the same frequency with a 90-degree phase difference.

17. The television tuner according to claim 1 wherein the second local oscillator includes:
   a plurality of voltage control oscillators (VCOs) combined to generate an oscillating signal with a desired frequency range; and a frequency-divider coupled to the voltage control oscillator for dividing the oscillating signal to generate the second reference signal with the tunable frequency.

18. The television tuner according to claim 1 wherein the second local oscillator includes:
a single voltage control oscillators (VCO) for generating an oscillating signal with a desired frequency range; and
a frequency-divider coupled to the voltage control oscillator for dividing the oscillating signal to generate the second reference signal with the tunable frequency.

19. The television tuner according to claim 1 wherein the double quadrature mixer generates an in-phase in-phase signal, an in-phase quadrature-phase signal, a quadrature-phase in-phase signal and a quadrature-phase quadrature-phase signal by mixing the first in-phase signal and first quadrature-phase signal with the seond reference signal, and respectively adds the in-phase in-phase signal and quadrature-phase in-phase signal to obtain the second in-phase signal, and adds the in-phase quadrature-phase signal and the quadrature-phase quadrature-phase signal to obtain the second quadrature-phase signal.

\* \* \* \* \*